Figure 1:
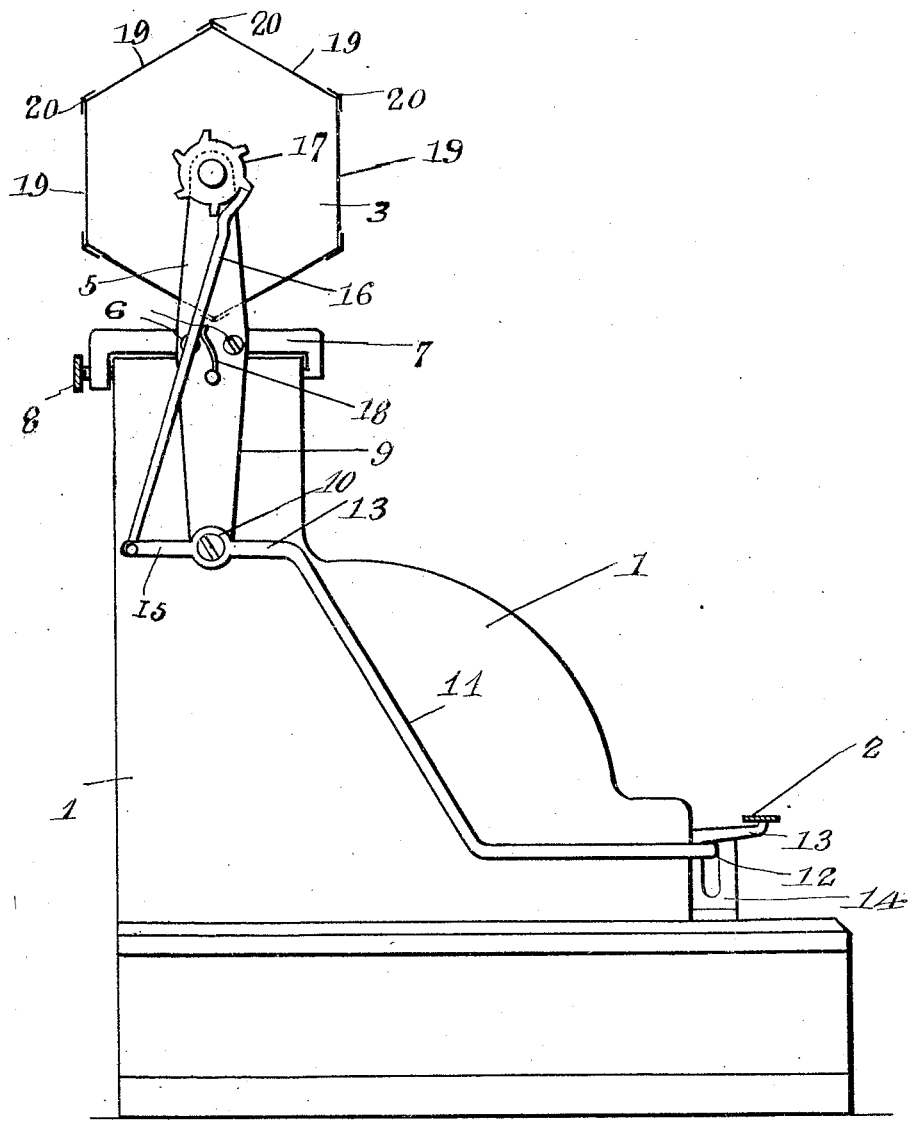

F. A. JONES.
AUTOMATIC ADVERTISING DEVICE.
APPLICATION FILED MAR. 20, 1919.

1,363,121. Patented Dec. 21, 1920.
2 SHEETS—SHEET 1.

Witnesses

Inventor
Frank A. Jones

UNITED STATES PATENT OFFICE.

FRANK A. JONES, OF DAYTON, KENTUCKY.

AUTOMATIC ADVERTISING DEVICE.

1,363,121.   Specification of Letters Patent.   Patented Dec. 21, 1920.

Application filed March 20, 1919. Serial No. 283,944.

*To all whom it may concern:*

Be it known that I, FRANK A. JONES, a citizen of the United States, at present residing at Dayton, in the county of Campbell and State of Kentucky, have invented new and useful Improvements in Automatic Advertising Devices, of which the following is a specification.

This invention relates to advertising devices and contemplates more particularly a revoluble sign for use in connection with cash registers and the like.

An object of the invention is to produce an automatically controlled revoluble sign capable of presenting variable reading matter in conjunction with the operation of the cash register and the amount of the purchase indicated thereon.

Another object of this invention is the production of a movable sign interconnected with the key operating mechanism of a cash register whereby a depression of any one or more of the keys will cause the operation of the sign.

A further object of the present invention is the production of a comparatively cheap, simple and effective advertising device which can be easily attached to an ordinary cash register or similar key-actuated mechanism.

With these and other objects in view the invention further consists in the construction and arrangement of the several parts hereinafter described and set forth in the appended claims.

In the drawings which show by way of illustration an embodiment of my invention and in which similar reference characters designate corresponding parts,—

Figure 2:
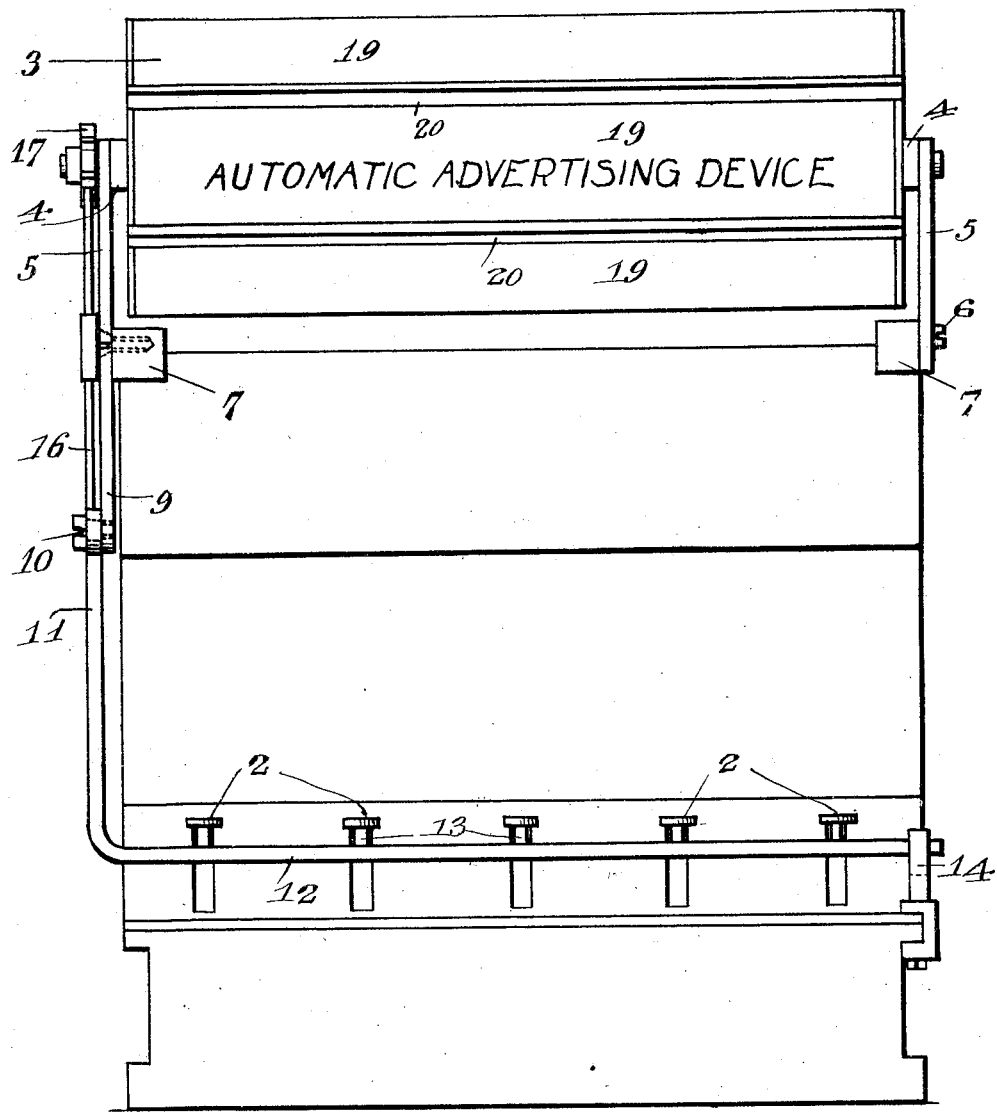

Figure 1 is an end elevation of my improved device as applied to a cash register of any well known construction; and Fig. 2 is a front view thereof.

The present invention has been primarily designed for use in silently calling to the attention of purchasers other goods on sale. It being the purpose of cash registers to indicate to the purchaser the amount of their purchase, the present device has been interconnected therewith so as to create a display in close proximity to the registered amount of the purchase either by way of comparison or with a view to obtaining additional sales.

Referring to the drawings, the cash register or similar mechanism is shown at 1 having attached thereto my improved advertising device. The cash register may be of any well known construction and no claim is laid to the form shown herein. Suitable keys 2 are provided for registering the amount of the purchase and as shown these keys are interconnected with the actuating mechanism of the advertising device to be hereinafter described.

The advertising device includes a display reel 3 having stub shafts suitably journaled in bearings 4 formed in uprights 5 extending above the cash register. The uprights 5 are secured by screws 6 to clamping members 7 which are designed to engage the top of the cash register as best shown in Fig. 1. Screws 8 are carried by the side of the cash register for securely fastening the advertising device thereto.

One of the uprights 5 is provided with a depending portion 9 to the lower end of which is pivoted at 10 an actuating lever or bar 11. This bar 11 is arranged with an offset 12 adapted to extend across the front of the register immediately beneath the projecting arms 13 of keys 2. The extreme end of the offset part 12 is preferably positioned in a bifurcated guide member 14 secured to the cash register. The purpose of this guide 14 is to keep the part 12 of the bar 11 in contact with the arms 13 of the keys 2 and insure the positive actuation of the mechanism when any one or more of the keys are depressed by an operator.

The actuating lever bar 11 is provided with an extending arm 15 to the end of which is secured one end of a pawl 16. The opposite end of the pawl 16 engages successively a series of teeth or notches on a ratchet wheel 17 secured to one end of the shaft with which the display reel revolved. The pawl 16 is held in contact with the ratchet wheel 17 by means of a spring 18 secured to portion 9 of the upright 5 and designed to bear against one side of the pawl as shown in Fig. 1.

In operation, any of the keys 2 of the cash register are depressed in accordance with the amount of the purchase, thereby depressing the offset part 12 of the actuating lever 11. This movement serves to elevate the arm 15 of the lever 11 and in turn force the pawl 16 upwardly against the tooth with which it is engaged, thereby imparting movement to the ratchet wheel 17, and the display reel 3. This reel 3 is preferably provided with a plurality of display faces 19 upon which suitable advertising matter can be inscribed.

Removable display cards may be used if desired and inserted between the retaining flanges formed on the ribs 20 of the reel.

From the foregoing it will be seen that a relatively simple and effective advertising device has been produced capable of being easily attached to an ordinary cash register and synchronously operable therewith for successively displaying a series of advertisements.

Various changes in the form and arrangement of my device may be made without departing from the spirit of the invention and I do not limit myself to the exact construction set forth herein.

I claim:

1. The combination with a cash register having operating keys, of a detachable reel mounted thereon, a ratchet wheel carried by said reel, a pawl adapted to engage the said ratchet wheel, a lever connected to said pawl for actuating the same, and means including an arm carried by said lever and extending beneath the aforesaid keys and upon the outside of the cash register for receiving motion when any one or more of the keys are depressed, whereby the reel may be revolved.

2. The combination with a cash register having operating keys, of a display reel mounted thereon provided with stub shafts, a detachable support for said reel including arms forming bearings for said stub shafts, a ratchet wheel provided on one of said shafts, a relatively long arm forming a pawl for actuating said ratchet, and a lever having one end connected to the aforesaid arm and the other end operably associated with the keys of the cash register.

3. The combination with a cash register having operating keys, of a display reel mounted thereon, a detachable support for said display reel, and means carried by said support for intermittently revolving the reel when the aforesaid keys are operated, said means including a pivoted lever mounted upon said support having one end interconnected with the display reel and the other end operably associated with the keys of the cash register.

4. The combination with a cash register having operating keys, of a display reel detachably mounted upon the outside of the cash register, and means mounted upon the outside of the cash register and operably connected with the aforesaid display reel and operating keys whereby the operation of said keys will cause the display reel to operate.

FRANK A. JONES.